United States Patent [19]

Taudt

[11] 4,363,037
[45] Dec. 7, 1982

[54] APPARATUS AND PROCESS FOR RECORDING AN IMAGE FREE OF LINE STRUCTURE

[75] Inventor: Heinz Taudt, Kiel, Fed. Rep. of Germany

[73] Assignee: Dr.-Ing. Rudolf Hell GmbH, Kiel, Fed. Rep. of Germany

[21] Appl. No.: 133,878

[22] Filed: Mar. 24, 1980

Related U.S. Application Data

[63] Continuation of Ser. No. 821,657, Aug. 4, 1977, abandoned.

[30] Foreign Application Priority Data

Aug. 7, 1976 [DE] Fed. Rep. of Germany ....... 2635674

[51] Int. Cl.³ .......................................... A04N 1/22
[52] U.S. Cl. ................................. 358/296; 358/302; 358/251
[58] Field of Search ............... 358/302, 298, 296, 132, 358/130, 75, 78, 127, 251; 346/108

[56] References Cited

U.S. PATENT DOCUMENTS

| 2,969,709 | 1/1961 | Zeyer ................................. 356/404 |
| 3,272,918 | 9/1966 | Koll ................................... 358/298 |
| 3,617,626 | 11/1971 | Bluth ..................................... 358/4 |
| 3,820,123 | 6/1974 | Ammann ........................... 346/108 |
| 3,876,829 | 4/1975 | Schiber ............................. 358/251 |
| 3,904,816 | 9/1975 | Taudt ................................. 358/80 |
| 3,956,583 | 5/1976 | Pugsley ............................... 358/78 |
| 4,025,189 | 5/1977 | Pugsley ............................. 358/298 |

FOREIGN PATENT DOCUMENTS

| 1035475 | 7/1964 | Fed. Rep. of Germany ...... 356/404 |
| 2404393 | 10/1974 | Fed. Rep. of Germany ...... 358/251 |
| 2416265 | 10/1974 | Fed. Rep. of Germany ...... 346/108 |

OTHER PUBLICATIONS

ETZ Publication–Journal Elektrotechnische Zeitschrift, vol. 13, Issue 22, 10/30/61, p. 590.

*Primary Examiner*—Alan Faber
*Attorney, Agent, or Firm*—Ernest F. Marmorek

[57] ABSTRACT

An apparatus and a process for the recording of an image free of any line structure includes sensing an image along a set of successive scanning lines, converting light values of the scanning lines into electrical signals, processing the electrical signals, and converting the processed electrical signals into a set of successive recorded lines, predetermined groups of recorded lines corresponding to selected scanning lines.

7 Claims, 5 Drawing Figures

APPARATUS AND PROCESS FOR RECORDING AN IMAGE FREE OF LINE STRUCTURE

This is a continuation of application Ser. No. 821,657, filed on Aug. 4, 1977, now abandoned.

BACKGROUND OF THE INVENTION

The present invention relates to an apparatus and a method for the recording of an image free of any line structure.

In displaying or recording an image, for example in television, transmission of photographs for the press, weather maps, written matter or the like through conductive lines, or by means of a radio frequency carrier, the image is at first scanned line-by-line and then reconstructed accordingly. Upon reconstruction or reproduction of the image, there is used a beam which is deflected line-by-line, and which is modulated in accordance with an image signal obtained during scanning of the original image. This method has been known for a long time, but has the disadvantage, that the line structure, which results from the Gaussian energy distribution of the beam used, and from the distance between the individual lines, becomes visible. These two facts, or causes, have so far permitted only a choice between two errors.

Adjacent lines are either spaced apart relative to the median width of the beam, which permits an optimal resolution of the image as a result of a good local separation of the image information, but the fluctuating intensity of successive lines due to an interspace occurring between adjacent lines is disturbing to an observer; if, on the other hand, the distance between the lines is smaller than the median width of the beam, and if the aforesaid brightness fluctuations can be eliminated by overlapping of lines, then the image resolution is diminished. These problems are known per se and are, for example, discussed in the Journal "Elektrotechnische Zeitschrift", volume 13, issue 22, of Oct. 30, 1961, page 590. In order to avoid these errors, the writing spot of the beam is either enlarged somewhat in a diffused manner, which results in a loss of resolution of the image, or the writing beam is rapidly wobbled in a direction transverse to the recording direction. This is indeed an improvement, and the resolution of the image is safeguarded, but successive lines still show remaining fluctuations in brightness, if the wobble amplitude cannot be tailored very exactly to the distance or spacing between adjacent lines. Furthermore, it is necessary to use deflection means and a video frequency controllable modulator, when using an electron beam as a recording beam, or when using a light beam; when using a modulator, additional light is being lost. As an acousto-optical modulator operates in a trouble-free manner only if the Bragg angle, through which the modulator is inclined with respect to the direction of the beam, can be maintained very accurately, a very precise adjustment of the modulator with respect to the light beam is required. Furthermore, any part of the beam, which has not been deflected must be removed, which causes further losses.

If the Bragg angle is not exactly adjusted, be it by the change of the wobble frequency or by a mechanical change during operation, then the intensity distribution in the direction of wobble changes, so that there occurs a higher beam intensity in one direction of deflection compared to the other direction. This causes, however, renewed visibility of lines.

From German Patent DT-OS No. 2,404,393 or the corresponding U.S. Pat. No. 3,876,829, there has become known another method to suppress the raster of an image. When using a light beam for recording, the light beam is subdivided by means of a plurality of adjacently positioned shutter-type openings into a plurality of partial beams, which are then recorded through optical means as a plurality of individual lines, so that an interspace between the lines is avoided. This method has the disadvantage, however, that light is being lost through the regions between the openings and peripheral regions. Additional light is being lost, as a light stop must be arranged in the center portion of the beam, which center portion is of approximately equal intensity, if the partial rays are also to have equal intensities. Additionally, the fabrication of such light stops is costly, and the light transmission characteristics of these light stops can be impaired, if they are contaminated by dust particles or the like.

SUMMARY OF THE INVENTION

One of the principal objects of the present invention is to avoid the aforesaid disadvantages so as to obtain an apparatus and a method which completely suppress the line raster structure of an image, without there being a loss of any image resolution.

Accordingly, an apparatus and a process for a recording of an image free of any line structure includes sensing an image along a set of successive, substantially adjacent scanning lines, each of the scanning lines being defined by a multiplicity of points having predetermined line values, such as light intensity or luminosity, converting the light values into electrical signals, corresponding to the set of scanning lines, processing the electrical signals according to a predetermined pattern, and converting the processed electrical signals into a set of successive, at least adjacent recording lines, predetermined groups of the set of recorded lines corresponding to the selected scanning lines.

The image is preferably sensed by means of a scanning beam which has a first diameter, and the image is preferably recorded by means of a recording beam having a second diameter; the second diameter is smaller than the first diameter, and one of the scanning lines corresponds to a group of the recorded lines.

The second diameter is preferably selected to be sufficiently large so that at least some of the recorded lines in each group will overlap.

The groups of the set of recorded lines may be selected so that at least some of the groups of the recorded lines overlap. Alternatively, each of the groups of the set of recorded lines may be derived from a respective one of the scanning lines. In a further refinement of the invention, each of the groups of the set of recorded lines is derived from a mixture of the scanning lines and a predetermined combination of adjacent scanning lines. The sensed points of each of the scanning lines are stored, and control the recording beam. In an additional refinement of the invention, the sensed points of adjacent scanning lines are stored, and the groups of the set of recorded lines are derived from average values of the stored sensed points of the adjacent scanning lines.

The apparatus for the recording of an image free of any line structure includes, according to the present invention, sensing means operable for sensing an image along a set of successive, substantially adjacent scanning lines, each of the scanning lines being defined by a multiplicity of points having respective predetermined light values, such as light intensities and luminosities, conversion means connected to the sensing means and being operative for converting the light values into electrical signals corresponding to the set of scanning lines, memory means connected to the conversion means and being operable for storing the electrical signals, processing means connected to the memory means and being operative for processing the stored electrical signals according to a predetermined pattern, and converter means connected to the processing means operable for converting the processed signals into a set of successive, at least adjacent recording lines, predetermined groups of the set of recording lines, corresponding to selected scanning lines.

It is advantageous if the distance between lines is reduced in an appropriate measure in correspondence with the diameter of the writing means, at least in a direction transverse to the direction of the lines, the line distance reduction corresponding to the beam diameter reduction, the number of lines written being increased per image in a similar ratio. This does not, however, necessitate an increase in the number of lines scanned, and hence an increase in the transmission capability, which is mostly limited by transmission noise and the transmission band-width of the transmission means used.

In a preferred method of implementation, it is advantageous if the image content of a scanned image line is stored in an intermediate memory, and that the image is read out from the intermediate memory and recorded several times; this requires a memory for at least two scanning lines. While the light values of the image line scanned last are slowly being written into one half of the memory, the light values of the previously scanned line are read out and recorded from the other memory half rapidly, and several times in succession. This method has the great advantage that the lines are advanced in a completely regular manner independently of the contents of the image. One, therefore, obtains no longer a raster visible as a result of the method of recording used. Each of two memory portions may thus be operated independently of the other memory portion and is capable of storing the quantized contents of at least one image line. The technical process of storing the light values of individual lines and their corresponding recording at a changed velocity has become known from U.S. Pat. No. 3,272,918 (German Pat. No. 1,193,534) and has been implemented for several years by the chromograph devices of Dr. Hell's company, so that the technical implementation of this part of the method need not be described in greater detail.

In the method, according to the present invention, a raster is completely eliminated, when recording the image. There remains, however, in the recording a certain unevenness or coarseness due to the relatively coarse scanning in relation to the recording. A further reduction of the line structure or image coarseness is achieved due to a further inventive step, without any increase of the image information to be transmitted, by using an intermediate memory to store the image content of two adjacent scanning lines, and by obtaining from an averaging of scanning values of two adjacent points from the two lines, image values of the line to be recorded, which line to be recorded has a geometric transmission value between the two scanning lines. If the image contents of three successive scanning lines are being denoted by A, B, and C respectively, then it is possible for example, to write or record the line A three times, to then write or record two lines, each of the two lines including a mixture of line A and line B, and then to write or record two lines of a mixture between lines B and C, and finally to record three lines corresponding to line C. This results in five written or recorded lines per scanning line. Even the limiting value of a single line obtained from A, A+A, B+C, C and so forth represents a considerable improvement in reducing the visibility of the raster, according to the inventive thought of writing the plurality of lines while maintaining the same image content.

It is alternately possible to interrogate one scanning line several times, instead of using an intermediate storage.

BRIEF DESCRIPTION OF THE DRAWINGS

For a fuller understanding of the nature and objects of the present invention, reference should be had to the following detailed description, taken in conjunction with the accompanying drawings in which.

DESCRIPTION OF THE PREFERRED EMBODIMENTS

Figure 1:
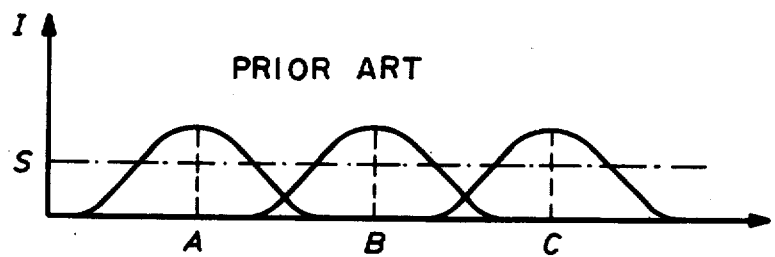
FIG. 1 shows the intensity distribution of a writing beam of over several lines of an image in which the raster is visible, (prior art)
Figure 2:
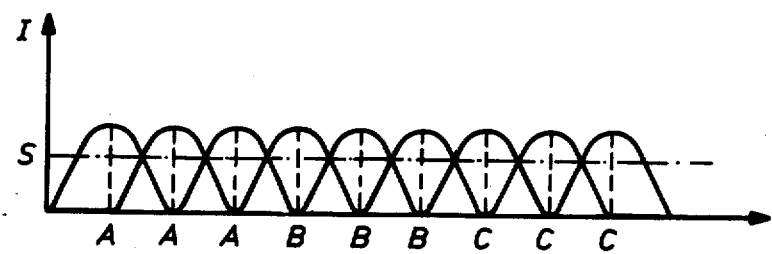
FIG. 2 shows the intensity distribution of a writing beam over several lines in a first version of the present invention.
Figure 3:
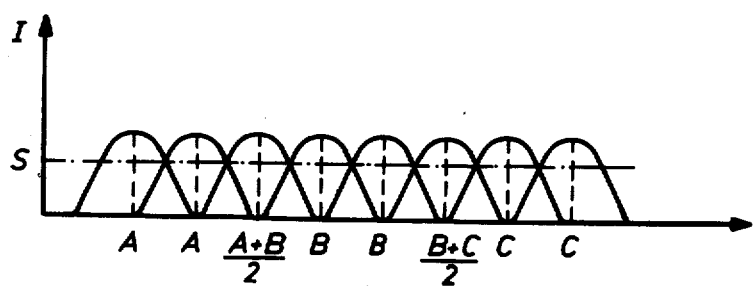
FIG. 3 shows the intensity distribution in a second version of the present invention.

In carrying the invention into effect, there are shown in FIGS. 1 to 3, different distributions of the intensities of a writing beam in a direction transverse to the direction of the line.

FIG. 1 shows the intensity distribution of the prior art, having a line structure, for example, of three lines A, B, and C, whose average intensity has been shown dotted, and which correspond to the respective energy maxima of the individual partial beams. Although the partial beams overlap, the intensity at the overlapping regions is below an indicating threshold value S of the recording material.

FIG. 2 shows the intensity distribution for a case where, according to the present invention, each line is recorded in a multiple manner, namely three times. The advance is selected to be equal in every case, and the cross-section of each partial beam is correspondingly reduced. As can be seen from FIG. 2, the amplitude fluctuations in a direction transverse to the direction of the line are considerably smaller when these lines are summed, or added and the amplitude fluctuations are further reduced by dispersing effects, so as then to become virtually invisible to the eye. The intensity of the overlapping regions is always above the threshold value S.

A different implementation is shown in FIG. 3. At first the same line is recorded twice (A,A), then a mixture between the first and second lines $$\left(\frac{A+B}{2}\right)$$

then the second line is recorded twice (B,B) then follows a mixture of the second line and the line following the second line $$\left(\frac{B+B}{2}\right)$$

and so on. If a mixture of lines is recorded, then the partial beams have correspondingly lower respective cross-sections $$\left(\frac{A+B}{2}\right),$$

compared to a hypothetical addition of intensities (A+B). By means of this type of recording, the image information is distributed approximately in correspondence with the distribution prevailing on the scanning side. The intensity of the overlapping regions here is also above the threshold value S.

Figure 4:
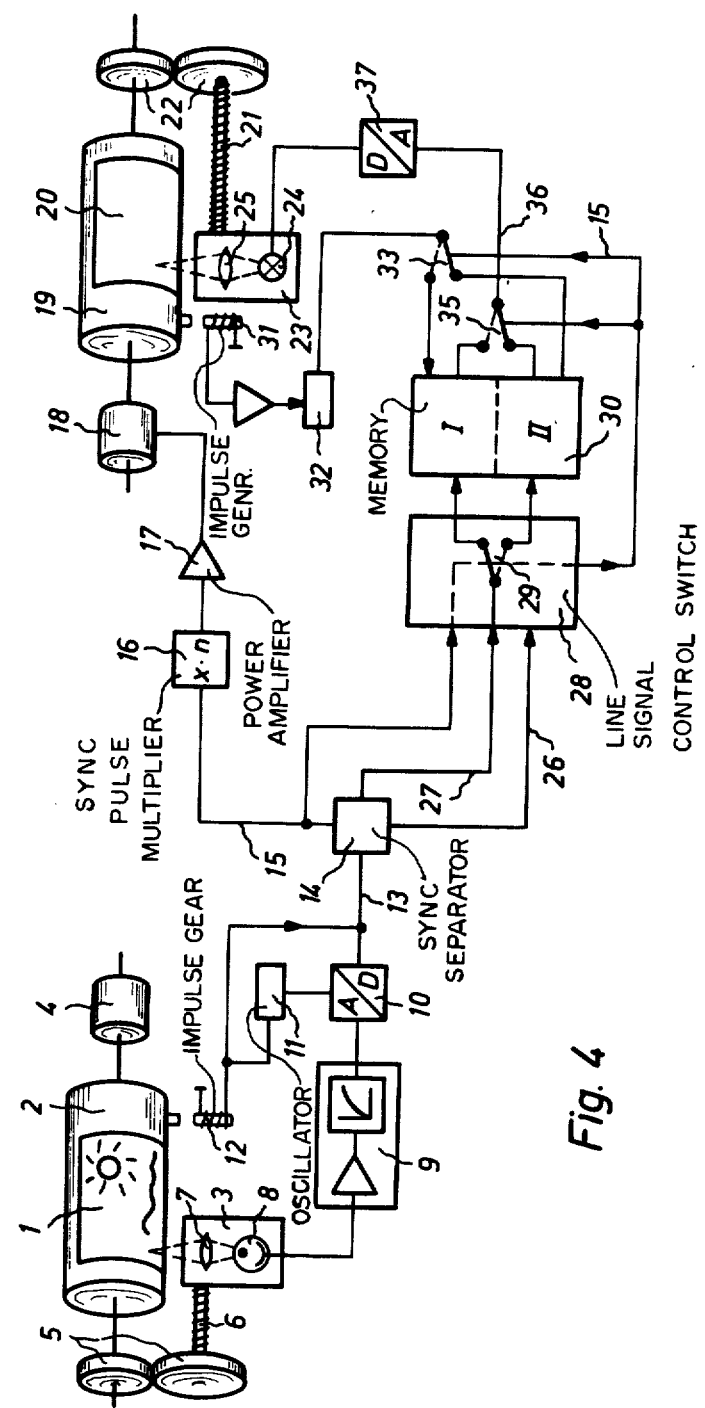
FIG. 4 is an example of a drum recording device for rasterless image recording.

FIG. 4 shows an implementation of the present invention as a drum scanning-and recording device for the transmission of images. Such devices are used in the reproduction art for reproducing of images, or for the televising of images, and are also termed facsimile transmission devices.

An image 1 to be transmitted is secured to a rotatable sensing drum 2 and is scanned along the drum 2 by means of an axially displaceable opto-electronic sensing head 3, either by light reflection, or light projection from within the drum, the image being scanned point-by-point and line-by-line. The axial advancement of the sensing head 3 can be accomplished continuously, or in a step-by-step manner, the scanning lines then having the form of spirals, helicoids, or circles. The drum 2 is driven by a motor 4, which rotates a shaft 6 through a gear 5, which latter effects a continuous axial advancement of the sensing head 3. The drum 2 is rotated at a speed dependent on the desired image transmission and the available transmission bandwidth. Typical numbers used are 60, 120, 240, 480 and 960 R.P.M., although devices exist which operate at 3,500 R.P.M.

The sensing head 3 includes a schematically shown optical system 7, and an opto-electronic transducer 8, on whose output there appears an image signal in analog form, which is corrected in a gradation stage 9, known per se from German Patent DT-PS No. 1,035,475, and then changed into digital signals through an analog-to-digital (A/D) converter 10 connected to the gradation stage 9. The A/D converter 10 may be selected to quantize the analog image signal to 4 to 7 bits, or even 8 bits, if exceptionally good resolution is desired.

The digitizing of the analog image signal is accomplished at a frequency which is determined by an oscillator 11, and fed therefrom to the analog-to-digital converter. The oscillator 11 is synchronized by an impulse transmitter 12 for each revolution of the drum in FIG. 4, there being shown, for example, an inductive impulse starter. But it is equally possible to use optical or mechanical impulse starters for this purpose. The frequency of the oscillator 11 is chosen to insure an adequately fine resolution of the image signal in analog form.

The oscillator 11 provides a frequency for the temporal digitization or resolution of the image signal in analog form supplied from the gradation stage 9 to the analog-to-digital converter 10. Thus, if the drum rotates at 60 R.P.M., for example, and the image is quantized to 4 bits, then for 280 effective "image points" per line, the sample frequency of the oscillator 11 will be 1,120 Hz.

The start signal supplied by the impulse starter 12, and the digitized image signals are supplied via a transmission means 13, which may also be a send-receive path, to the receiving side.

A switch 14 separates the starting impulses, the image signals and the image frequency, which latter contains the digital image signals. The starting impulses are fed via a line 15 to a frequency multiplier 16, where they are multiplied. The frequency multiplier is preferably implemented as a phase-locked loop. The multiplication factor of the multiplier 16 is selected so that it corresponds to the number of lines which are to be written having the same information content. The multiplied signal is processed in a power amplifier 17 and utilized to drive a synchronous motor 18, which in turn drives the recording drum 19, to which there is secured a recording carrier 20. As is the case on the scanning side, a shaft 21 is driven by the recording drum 19 through a gear train 22, by means of which the recording head 23 is moved axially along the recording drum. The recording head 23 usually includes a writing bulb 24, and a schematically illustrated optical system, or a laser unit 25, by means of which the image is recorded line-by-line.

In order to record the image free of any line structure, the digitized image signal arriving from a scanner via a switch 14 is fed in an alternating manner with the aid of the line starting impulses to the line 15, and with the aid of the image frequency to a line 26 via an addressing switch 28, in a line-by-line alternating manner, to two memory regions I and II of a memory 30.

The addressing switch 28 controls the alternating storage of the lines in the memory regions I and II of the memory 30 by means of a switch 29, controlled by the line starting impulses. This type of storage of the lines, using alternating read-outs, has already become known for a different utilization, namely for the electronic enlargement of an image, from DT-PS No. 1,193,534 (U.S. Pat. No. 3,272,918), so that a description of the details of control can be dispensed with.

In order to avoid any errors during reproduction of an image from the memory, due to any change in the angular position between the scanning drum 2, and the recording drum 19, the line frequency, by means of which the image signals are recorded, is obtained directly from the drum 19.

If the frequency of the scanning unit were to be used therefor, then any play in the gear train 22, in the couplings used, and any inaccuracies in the speed of the motor, could result in an erroneous synchronization of the signals on the recording carrier, and therefore result in errors.

In order to obtain the recording line frequency directly from the drum 19, there is provided an impulse starter 31, which is constructed in a manner similar to the impulse starter 12 disposed on the scanning side, and which starts an oscillator 32 at the start of a line. The oscillator 32 controls by its frequency the read-out of the image signals from the memory 30 for recording purposes.

As the drum 19 rotates more rapidly than the drum 2, due to the frequency multiplication in the multiplier 16 by a factor equal to the factor set for multiple recording of a line, the impulse starter 31 supplies a corresponding multiple of the impulses, and the oscillator 32 supplies a frequency which is a corresponding multiple of the frequency of the oscillator 11.

The switching of the frequency supplied by the oscillator 32 in an alternating manner from line-to-line to the two memory regions I and II of the memory 30 is accomplished through a switch 33, which is actuated through the line 15 by the line start impulses of the scanning mechanism. By means of the switching frequency signal of the switch 33, a respective line processed is read out in a multiple fashion through a switch 35, which is also driven by the switching frequency of the switch 33, and is then supplied through the rythm of a switch 35, which also operates at that switching frequency, to a digital-to-analog converter 37, which controls the recording light source 24 of the recording head 23.

The recording, or memorization, of the individual lines in the memory 30 permits a change of scale between scanning and recording by means of a change of frequency of the oscillator 32, and an appropriate change of the transmission ratio of the gear train 22, in a relatively easy manner.

A variation of the arrangement described in FIG. 4 may also be accomplished by transmitting the image signals through a line 13, or through a transmission path, not digitally, but in an analog fashion, the starting impulses delivered by the impulse starter 12 being transmitted therethrough also. The conversion of the analog-to-digital signals can be accomplished on the recording side. The principle of the present invention may, however, be applied to both versions.

Figure 5:
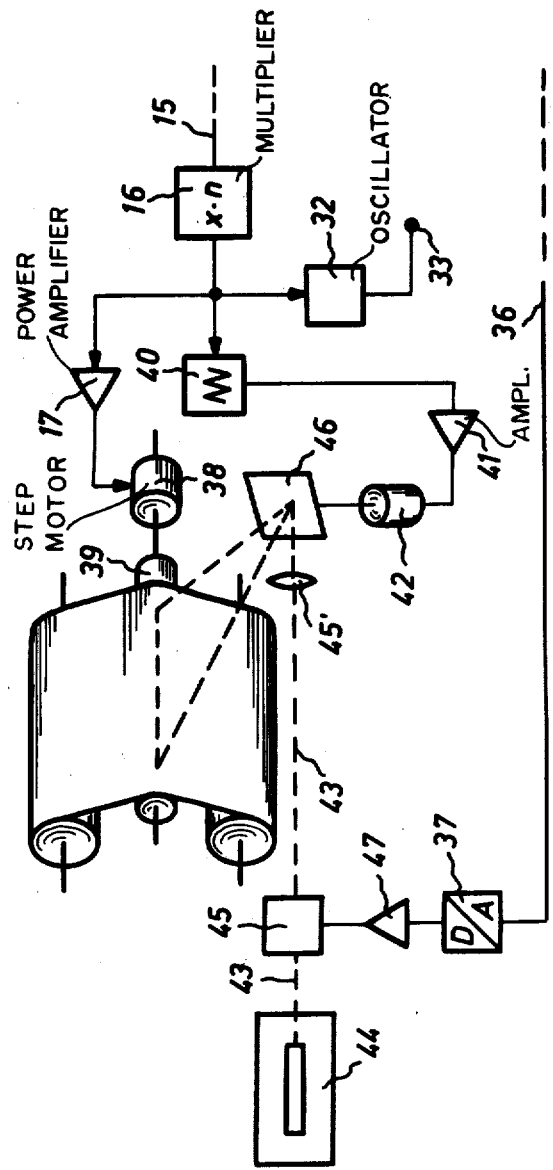
FIG. 5 is an example of an image recording device for a raster-free recording of an image on a substantially flat surface.

FIG. 5 shows another variation of the invention implemented by means of a laser recording unit. The line-starting impulses arriving through the line 15 are transformed in the multiplier 16 to line-starting impulses for recording, the multiplication factor being obtained from the requirement as to how many times the same line should be repeated on the recording side. The line-starting impulses drive a stepping motor 38 through a power amplifier 17. A drum 39 is rotated by the stepping motor through one width of a line, resulting in a line-by-line movement of the recording foil in the recording plane, the image being recorded on the recording foil.

The frequency obtained from the multiplier 16 is used for synchronization of a saw-tooth generator 40, which deflects an electromagnetically driven galvanometer 42, and a mirror 46 thereof through an amplifier 41, the saw-tooth generator 40 being adjusted or set, so that it deflects a laser beam 43 modulated by an image signal line-by-line over the recording foil. The modulator 43 is additionally arranged to blank out the laser beam on the beam's return stroke, as implemented in German Patent DT-OS No. 24 16 265, FIG. 4.

The laser beam 43 is generated in a laser 44, and is transmitted through a modulator 45, and a schematically illustrated in optical system 45', to a galvonometer 46.

Unlike the scheme used in the recording unit of FIG. 4, the line-starting impulses multiplied by the multiplier 16 are used for synchronization of the oscillator 32, the individual image signals being read out from the memory with the aid of the frequency generated by the oscillator 32, as has been described for FIG. 4, and are then fed to the digital-to-analog converter 37, which controls the modulator 45 through a power amplifier 47. A known sound-to-light transducer is preferably used as a modulator 45.

The apparatus and method disclosed in the present invention is not limited to the examples illustrated. It may be utilized in principle, whether recording is accomplished by a moving light or electron beam, or a light electron beam moving with respect to a recording surface, namely in devices in which the recording surface moves past the guiding beam, or where the writing beam moves past a stationary recording surface.

It is equally applicable to color images, or usable in conjunction with color picture editing and recording systems such as, for example, disclosed in U.S. Pat. No. 3,617,626.

Having thus described the invention, what I claim as new and desire to be secured by Letters Patent, is as follows:

1. In a process for line-by-line recording of an image with the aid of an intermediate memory,
   the steps comprising:
   generating scanning signals by sensing the light values of the image along successive, substantially adjacent scanning lines, each of said scanning lines having a predetermined width,
   converting the scanning signals into electrical signals,
   storing the electrical signals associated with at least one of said scanning lines in said intermediate memory,
   sequentially reading out at least two times at least a portion of the electrical signals associated with each of said scanning lines, respectively, from said intermediate memory, so as to obtain groups of successive electrical signals representing the light values for recording groups of sub-lines, each group of sub-lines corresponding to a scanning line, and
   sequentially recording said groups of sub-lines, each of said sub-lines having a width sufficiently smaller than the width of said scanning lines, so that an image substantially free of any line structure and loss in resolution is obtained.

2. In a process as claimed in claim 1, wherein said portion of the electrical signals associated with each of said scanning lines includes the electrical signals associated substantially with a corresponding scanning line, whereby the light values of the sublines of a group are derived from the light values of a corresponding scanning line.

3. In a process as claimed in claim 1, wherein said portion of the electrical signals associated with each of said scanning lines includes a predetermined fraction of the electrical signals associated with a corresponding scanning line, and further comprising the steps of:
   reading out the predetermined fractions of the electrical signals associated substantially with a corresponding scanning line, and with a scanning line immediately following said corresponding scanning line,
   combining said predetermined fractions of said electrical signals, so as to obtain mixed electrical signals defining at least one modified sub-line, and recording said modified sub-line in the area of adjacent recorded groups of sub-lines, whereby the light values of said modified sub-lines are obtained from a mixture of the light values of adjacent scanning lines.

4. In a process as claimed in claim 1, further comprising the step of selecting the width of said sub-lines so that at least some of the sub-lines of each of said groups will overlap.

5. In a process as claimed in claim 1, further comprising the step of selecting said groups of sub-lines for at least some of said groups to overlap.

6. An apparatus for line-by-line recording of an image without any line structure, comprising in combination:

scanning means for generating scanning signals by optoelectrically scanning said image along successive, substantially adjacent scanning lines, said scanning means having a scanning beam whose diameter corresponds to the width of the scanning lines, converting means connected to the scanning means operable for converting said scanning signals into electrical signals, storing means connected to the converting means for intermediate storing of said electrical signals, and recording means connected to said storing means and controlled by said electrical signals for the reading out thereof from the storing means, said recording means having a recording beam of a predetermined diameter, and being operable for reproducing each scanning line as a group of adjacent sub-lines recorded successively by said recording beam, the diameter of said recording beam being sufficiently smaller than the diameter of said scanning beam so as to obtain an image substantially free of any line structure and loss in resolution.

7. An apparatus as claimed in claim 6, further comprising combining means connected to said storing means and recording means operable for combining said predetermined fractions of said electrical signals to obtain mixed electrical signals.

* * * * *